US010890772B2

(12) United States Patent
Song et al.

(10) Patent No.: US 10,890,772 B2
(45) Date of Patent: Jan. 12, 2021

(54) GUIDED MODE RESONANCE DEVICE FOR OPTICAL BEAM TAPPING AND IMAGING WITHOUT RAINBOWS

(71) Applicant: The Board of Trustees of the Leland Stanford Junior University, Stanford, CA (US)

(72) Inventors: Jung-Hwan Song, Mountain View, CA (US); Mark L. Brongersma, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/537,030

(22) Filed: Aug. 9, 2019

(65) Prior Publication Data

US 2020/0049997 A1    Feb. 13, 2020

Related U.S. Application Data

(60) Provisional application No. 62/716,856, filed on Aug. 9, 2018.

(51) Int. Cl.
 *G02B 27/01* (2006.01)
 *G02B 27/00* (2006.01)
 *F21V 8/00* (2006.01)

(52) U.S. Cl.
 CPC ....... *G02B 27/0172* (2013.01); *G02B 6/0026* (2013.01); *G02B 27/0037* (2013.01); *G02B 27/0179* (2013.01); *G02B 2027/0116* (2013.01); *G02B 2027/0138* (2013.01); *G02B 2027/0178* (2013.01); *G02B 2027/0187* (2013.01)

(58) Field of Classification Search
 CPC .................................................. G02B 27/0056
 See application file for complete search history.

(56) References Cited

U.S. PATENT DOCUMENTS

| 9,625,717 | B2 | 4/2017 | Sunnari | |
|---|---|---|---|---|
| 10,073,267 | B2 * | 9/2018 | Tekolste | G02B 27/0081 |
| 10,234,686 | B2 * | 3/2019 | Vallius | G02B 6/005 |
| 10,241,332 | B2 * | 3/2019 | Vallius | G02B 5/1866 |
| 10,379,358 | B2 * | 8/2019 | Olkkonen | G02B 5/1823 |
| 10,690,831 | B2 * | 6/2020 | Calafiore | G02B 6/0046 |
| 10,761,330 | B2 * | 9/2020 | Lee | G02B 27/0172 |
| 2015/0253570 | A1 * | 9/2015 | Sunnari | G02B 27/4211 359/576 |
| 2017/0102544 | A1 | 4/2017 | Vallius | |

(Continued)

OTHER PUBLICATIONS

Vasiliev et al., "Photonic microstructures for energy-generating clear glass and net-zero energy buildings", 2016, Scientific Reports | 6:31831 | DOI: 10.1038/srep31831.

*Primary Examiner* — Rhonda S Peace
(74) *Attorney, Agent, or Firm* — Lumen Patent Firm

(57) ABSTRACT

Waveguide enhanced resonant diffraction is provided in grating structures having negligible non-resonant diffraction by the grating. This is done by making the grating thickness much less than any relevant wavelength, and by having the grating in proximity to a waveguide for diffractive coupling to and from a mode of the waveguide. Material absorption in the grating material can be used to suppress undesired diffraction orders. The resulting structures can provide rainbow-free diffractive optical sampling.

13 Claims, 12 Drawing Sheets

(56) References Cited

U.S. PATENT DOCUMENTS

| | | |
|---|---|---|
| 2017/0139210 A1 | 5/2017 | Vallius |
| 2017/0315356 A1 | 11/2017 | Tervo |
| 2019/0227316 A1* | 7/2019 | Lee .................... G02B 27/0081 |
| 2020/0041791 A1* | 2/2020 | Shipton .............. G02B 27/4211 |
| 2020/0049997 A1* | 2/2020 | Song .................. G02B 27/0093 |

* cited by examiner

Experiment

Simulation

GUIDED MODE RESONANCE DEVICE FOR OPTICAL BEAM TAPPING AND IMAGING WITHOUT RAINBOWS

CROSS REFERENCE TO RELATED APPLICATIONS

This application claims the benefit of U.S. provisional patent application 62/716,856, filed on Aug. 9, 2018, and hereby incorporated by reference in its entirety.

FIELD OF THE INVENTION

This invention relates to diffractive optical devices.

BACKGROUND

In various applications, it is often desired to unobtrusively sample light passing through a transparent window. For wavelength selective sampling, it has long been known that diffractive grating structures can perform the sampling function. However, conventional grating structures undesirably produce visually obtrusive rainbows.

SUMMARY

In this work, grating sampling structures that are virtually rainbow-free are provided. More specifically, a thin, nano-engineered optical coating is provided that facilitates extraction of light with a very select range of wavelengths, a well-defined polarization state, and/or angle of incidence. The extracted light can be redirected with a high efficiency into a desired direction. For example, the coating can allow effective transmission of visible light while redirecting infrared light with well-defined spectral, polarization and directional properties.

In one example, the optical coating is a multilayer structure having a substrate, a thin dielectric layer on the substrate, and a capping layer on the dielectric layer. An ultra-thin grating layer is disposed at the interface between the dielectric layer and the capping layer. The grating layer can be fabricated as part of the capping layer or as part of the dielectric layer. This structure supports a guided mode resonance (quasi-guided waveguide mode). The grating layer can be capable of absorbing light that excited the guided resonance with predetermined spectral content.

The coating could be applied to transparent and reflective substrates. To most of the incident light the guided mode resonance structure will essentially be invisible/hard to detect. However, the guided mode resonance structure also facilitates selective redirection of incident light with specified wavelength, polarization, or angle of incidence properties. This aspect is similar to the action of common plane ruled or holographic gratings.

However, the typical undesired rainbow effect that is intrinsically linked to the dispersive nature of these optical elements can be strongly suppressed due to the presence of the grating layer. The guided mode resonance coating ensures that all the incident light which satisfies the phase matching conditions and is redirected is forced to strongly interact with the grating layer as it is guided for some period of time/some length along the dielectric layer. In contrast, the light that is directly transmitted only weakly interacts with the grating and is thus hardly affected by the grating. This allows high transmission for most wavelengths, polarization states, and incident angles.

Such layers make this possible as the diffraction process relies on an initial redirection of light waves into the plane of the coating, a waveguiding along the coating and an ultimate redirection into a diffracted angle. The propagation/guiding occurs over a distance that is much larger than the physical thickness of the grating layer. This results in a significant enhancement of light-matter interaction with the grating layer and this can be exploited to effectively absorb guided waves at wavelength of light that would have otherwise given rise to a rainbow. It also allows free passage and effective redirection of light at other wavelengths where the grating layer is non-absorbing. The redirected light can be used for sensing and imaging.

Another way to appreciate this approach is to start by considering a strongly diffracting structure. Such a structure provides strong diffraction of all incident wavelengths into several diffraction orders, and therefore cannot effectively be made transparent. A weakly diffracting structure can readily be made transparent, but the diffraction efficiency of such structures is typically inadequate for applications. Enhancing the diffraction efficiency of a weakly diffracting structure via guided wave resonance selectively increases the diffraction efficiency at wavelengths and diffraction orders where the phase matching condition is satisfied. Finally, wavelength dependent absorption in the grating layer can be used to suppress all the undesired diffraction orders but let the desired diffracted order pass through with negligible absorption, thereby providing the desired rainbow-free optical tap. Here the grating layer is a weakly diffracting structure because it is ultra-thin (e.g., 10 nm thickness or less).

Applications include, but are not limited to: augmented and virtual reality systems, eye tracking and imaging, optical communication, display, goggles, imaging, spectroscopy, and microscopy.

Several variations are possible. The guided mode resonance structure can include one or more high-index dielectric layers. The guided mode resonance can be achieved through etching or deposition of features and/or materials into or on top of the dielectric guiding layer. The grating layer can be any material with a desired absorption spectrum, including e.g. semiconductors, organic dyes, metals, 2D materials such as graphene and metal-dichalcogenides. The coatings can be deposited on transparent, reflective and absorptive substrates. Electrically controllable materials could be used for some or all layers of the structure. Grating patterns other than parallel lines can be used.

DETAILED DESCRIPTION

Figure 1:
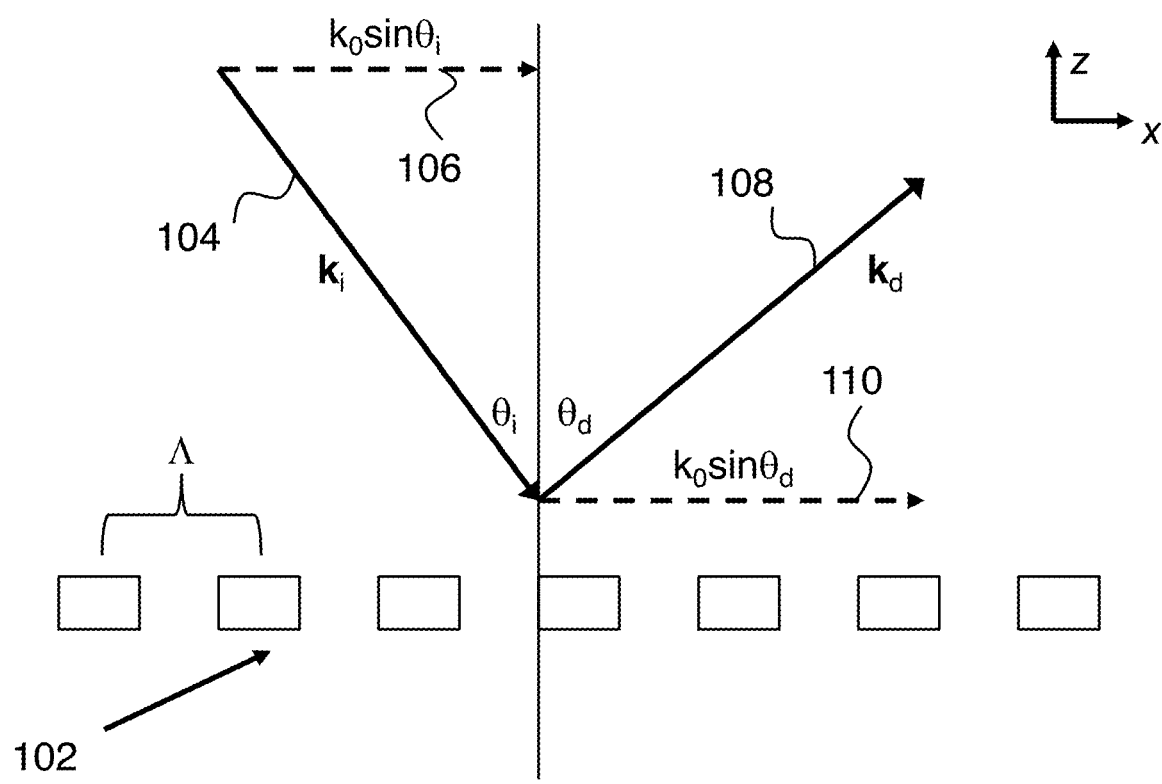
FIG. 1 shows the phase matching condition for conventional non-resonant diffraction.

To better appreciate this work, it is helpful to review conventional diffraction as shown on FIG. 1. Here incident light 104 with incident wave vector $k_i$ is diffracted into diffracted light 108 having diffracted wave vector $k_d$ by a diffraction grating 102 having period $\Lambda$. The phase matching condition for this process with the coordinates shown on the figure is equal x-components of the wave vectors (i.e., 106 and 110), while accounting for the grating's contribution. The resulting phase matching condition is given by:

$$k_0 \sin \theta_d = k_0 \sin \theta_i + 2\pi m/\Lambda \quad (1)$$

where $k_0 = 2\pi/\lambda$ is the free space wave number, $\lambda$ is the free space wavelength, and m is the diffraction order which can be any integer, positive, 0 or negative. For a given incident wavelength, incidence angle and grating period, there will be diffraction orders for each m for which Equation 1 can be solved for a real diffraction angle $\theta_d$. As indicated above, with a structure like this it is difficult to provide diffraction into only a single order, with negligible diffraction into other orders.

Figure 2:
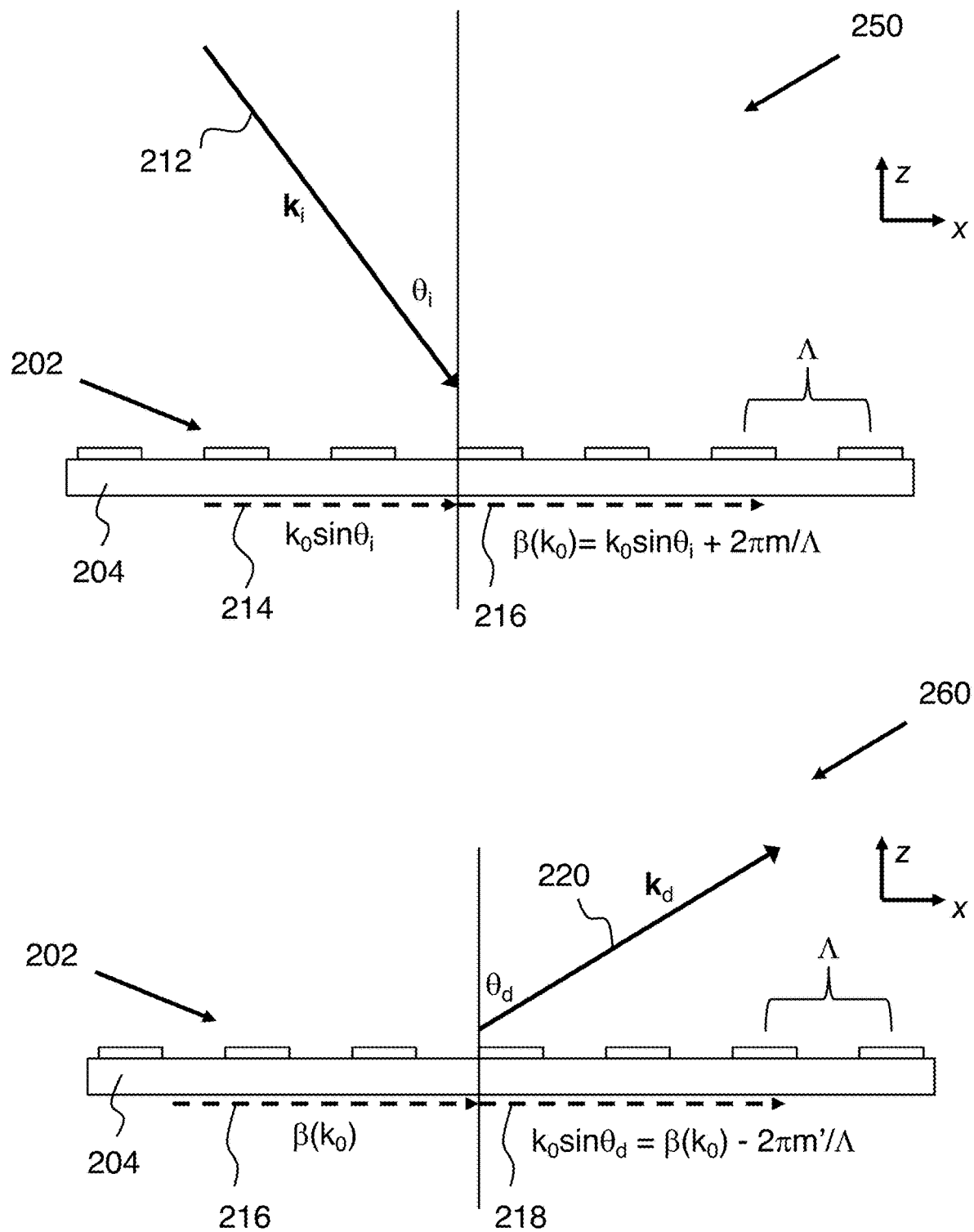
FIG. 2 shows the phase matching conditions for resonant diffraction.

Embodiments of the invention are based on resonant diffraction as shown on FIG. 2. Here incident light 212 having incident wave vector $k_i$ is incident on a grating 202 in proximity to a waveguide (schematically shown by 204). The first part 250 of this resonant diffraction process is diffractive coupling of the incident light to a waveguide mode. Here the phase matching condition is the propagation constant 216 of the waveguide mode being equal to the x-component 214 of the incident wave vector, while accounting for the grating's contribution. The resulting phase matching condition is given by:

$$\beta(k_0) = k_0 \sin \theta_i + 2\pi m/\Lambda \quad (2a)$$

where $\beta(k_0)$ is the propagation constant of the waveguide mode. The second part 260 of this resonant diffraction process is diffractive coupling of the waveguide mode to diffracted light 220 having diffracted wave vector $k_d$. Here the phase matching condition is the propagation constant 216 of the waveguide mode being equal to the x-component 218 of the diffracted wave vector, while accounting for the grating's contribution. The resulting phase matching condition is given by:

$$k_0 \sin \theta_d = \beta(k_0) - 2\pi m'/\Lambda. \quad (2b)$$

Here the diffraction orders m and m' in Equations 2a and 2b can be the same or they can be different.

In any real grating-on-waveguide structure, the processes of FIGS. 1 and 2 can both occur. However, it is possible, as described in greater detail below, to ensure that the resonant process of FIG. 2 is quantitatively much more relevant than the non-resonant process of FIG. 1. The main idea here is to make the grating so thin that the non-resonant process of FIG. 1 has negligible diffraction efficiency into all orders, while the resonant process of FIG. 2 has a significant diffraction efficiency into a desired diffraction order. This is schematically shown on the figures by grating 202 on FIG. 2 being thinner that grating 102 on FIG. 1. Also as described in greater detail below, it is easier to suppress undesired diffraction orders in the resonant process of FIG. 2 than in the non-resonant process of FIG. 1.

Accordingly, an embodiment of the invention is an optical apparatus including an optical waveguide and a diffraction grating disposed in proximity to the optical waveguide such that incident light on the diffraction grating can also diffractively couple to the optical waveguide. A first diffraction process (e.g., FIG. 1) is non-resonant diffraction of the incident light by the diffraction grating without coupling to the optical waveguide. A second diffraction process (e.g., FIG. 2) is resonant diffraction of the incident light via 1) diffractive coupling (e.g., 250 on FIG. 2) of the incident light to a guided mode of the optical waveguide to provide guided light, followed by 2) additional diffraction (e.g., 260 on FIG. 2) of the guided light into diffracted radiation. The efficiency of the second diffraction process is substantially larger than any efficiency of the first diffraction process at a predetermined incidence angle and frequency of the incident light.

It is convenient to define 'any efficiency' of the non-resonant diffraction process as including the efficiency of non-resonant diffraction into any single order, as well as the combined efficiency of non-resonant diffraction into all orders. E.g., if there are three orders with efficiencies 0.1%, 0.2%, 0.4%, the combined efficiency is 0.7%. We also define parasitic diffraction processes to include every diffraction process other than a selected resonant diffraction process. Typically these parasitic processes include all orders of non-resonant diffraction and all orders of resonant diffraction other than the selected order. The combined efficiency of parasitic diffraction processes is the fraction of incident light lost in all of these processes combined.

Accordingly, it is preferred for the efficiency of the second diffraction process to be 10× or more greater than any efficiency of the first diffraction process. It is also preferred that a combined efficiency of parasitic diffraction processes be 0.1% or less. Preferably the thickness of the diffraction grating is between 0.6 nm and 10 nm.

For such thin gratings, non-resonant diffraction as on FIG. 1 will be negligible, and only the resonant process of FIG. 2 can provide a substantial diffraction efficiency. More specifically, due to the thin grating thickness, we have high quality guided-mode resonance, meaning that the guided waves dwell thousands of optical cycles inside the waveguide before escaping into out-going diffracted radiation. This long dwell time accumulates the internal fields inside the waveguide and amplifies the overall diffraction efficiency as a result. If the incident wave were not satisfying the phase matching condition, it would not couple to the guided-mode resonance and such non-resonant diffraction has very poor efficiency since it does not have any opportunity to be amplified.

Figure 3:
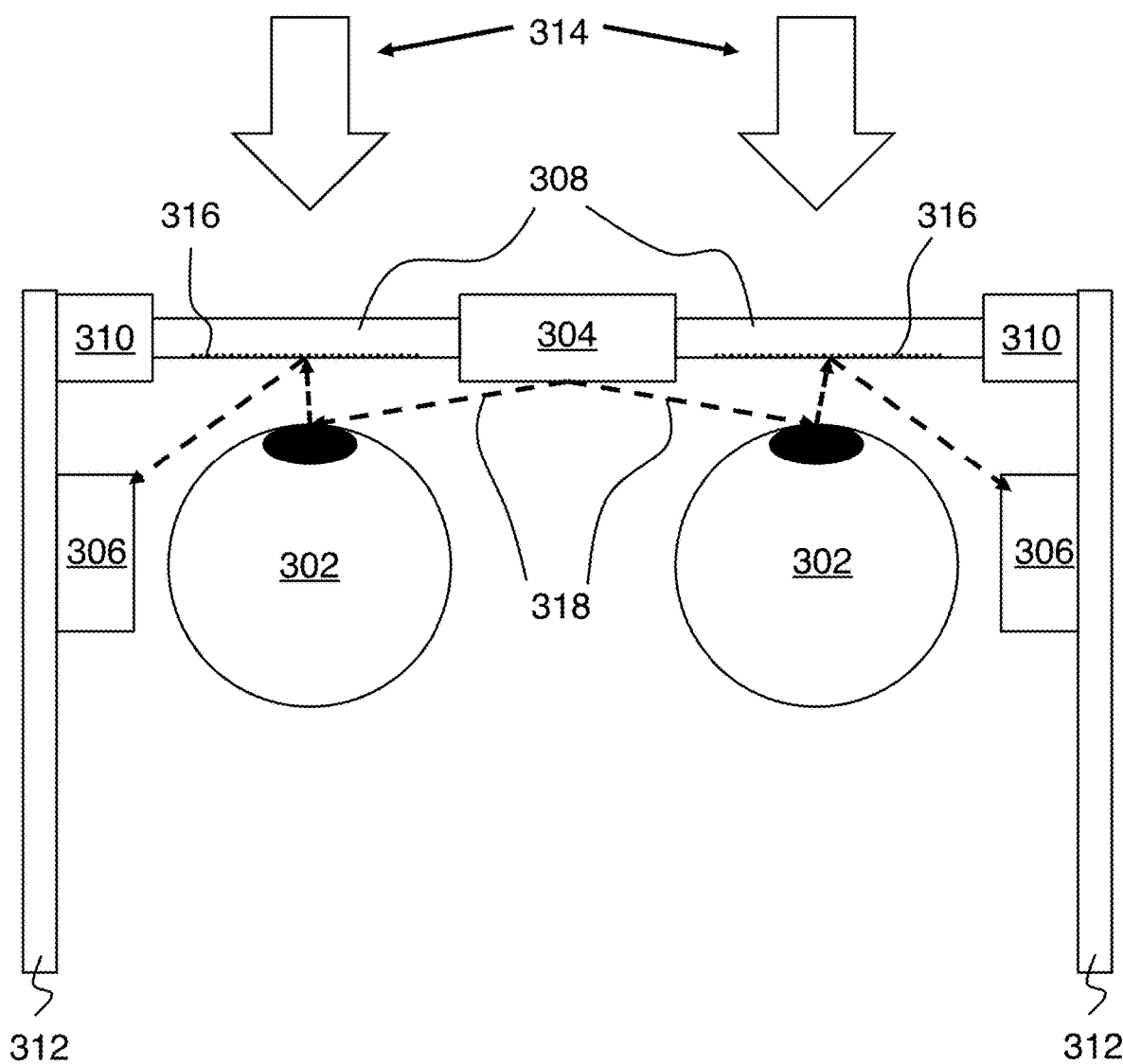
FIG. 3 shows an exemplary augmented reality display application for embodiments of the invention.

FIG. 3 shows an exemplary augmented reality (AR) display application for embodiments of the invention. Although there are many other applications of the invention, as indicated above, it is helpful to consider this application in more detail. FIG. 3 is a schematic top view of an AR display in operation. Here 302 are the user's eyes, and the idea is to provide tracking of the motion of the user's eyes in an unobtrusive way. The AR display is configured as glasses/goggles having a frame 310, lenses/windows 308 and ear pieces 312. An infrared (IR) source 304 is disposed on the AR display out of the field of view of the user's eyes (e.g., on a nose piece of the display). Infrared light 318 is emitted by IR source 304 and illuminates the user's eyes 302, schematically as shown. IR cameras 306 are also disposed on the AR display out of the field of view of the user's eyes (e.g., on the ear pieces of the display). Resonant diffraction structures 316 as described above are disposed on lenses/windows 308 designed to have negligible effect on visible light 314 and to redirect the IR light 318 for eye tracking as shown.

Accordingly, a preferred embodiment of the invention is an AR display including a resonant diffractive device as described above and an infrared source emitting at a source wavelength between 800 nm and 1500 nm. Here the resonant diffractive device is configured to have zero order transmittance of 90% or more in a wavelength range from 400 nm to 750 nm, and is also configured to provide selective redirection of light at the source wavelength via the resonant diffraction process of FIG. 2. Here also the thickness of the diffraction grating is preferably between 0.6 nm and 10 nm. The efficiency of the selective redirection of light at the source wavelength is preferably 10% or more. The combined efficiency of parasitic diffraction processes is preferably 0.1% or less. The diffraction grating is preferably formed in a material that is opaque in a wavelength range from 400 nm to 750 nm. Thus the lack of visible rainbows in this example is due to the strong effect of material absorption on the process of FIG. 2 because of the waveguide resonance. Note that material absorption has a negligible effect on the efficiency of the non-resonant process of FIG. 1, and instead it is the very low thickness of the grating (i.e., much less than a wavelength) that ensures the quantitative irrelevance of the process of FIG. 1. Practice of the invention does not dependent critically on the choice of grating material. For this application silicon is a suitable grating material because it can readily be fabricated in thin gratings, it absorbs visible light and is transparent to IR light.

Figure 4A:
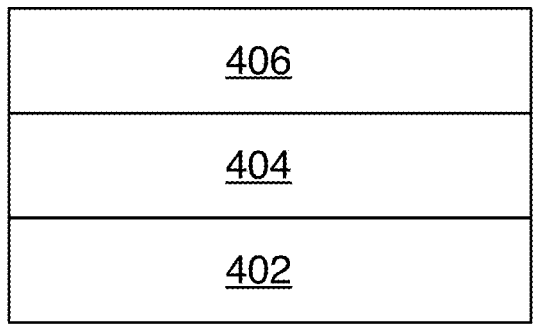
FIGS. 4A-B show an exemplary multi-layer stack and an exemplary plot of transmittance vs. wavelength of the multi-layer stack.
Figure 4B:
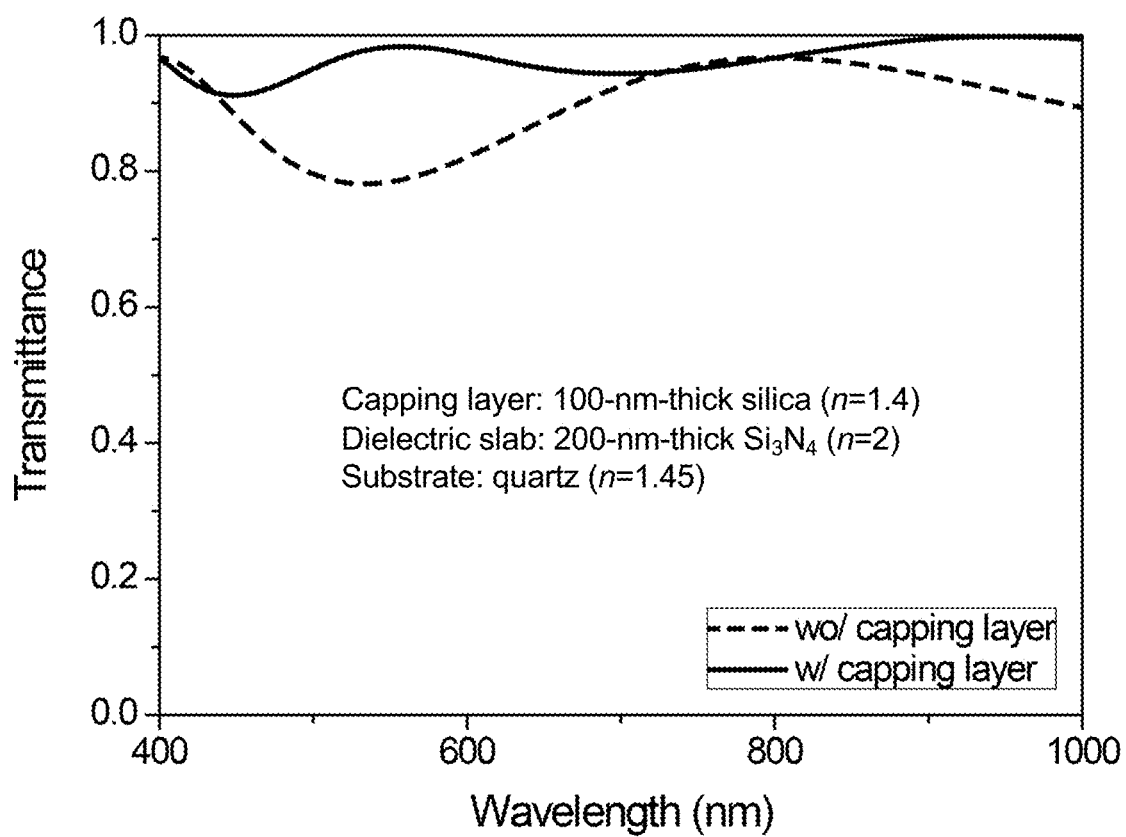

To consider the design of a suitable structure 316 for the exemplary application of FIG. 3, it is helpful to begin by considering a three layer stack of materials (e.g., 402, 404, 406 on FIG. 4A). The first two requirements are high transmittance in the visible and that this stack of materials forms a planar waveguide having layer 404 as its high index core. Here 406 is the capping layer, which is intended to reduce reflection. Its thickness could range from 60 to 400 nm, depending on the desired wavelength of anti-reflection. Its refractive index could vary from 1.45 to 1.8. The dielectric slab layer 404 will also support the guided mode resonance and will support a limited number of guided modes for transverse electric (TE) and transverse magnetic (TM) polarizations. The thickness could vary from 100 to 400 nm, depending on the operation wavelength. The refractive index should be larger than those of capping layer 406 and substrate 402 and is typically between 1.5 and 5. The substrate 402 is typically a transparent material, e.g., glass, quartz, sapphire, or a plastic with refractive index between 1.3 and 2. FIG. 4B shows an exemplary simulation result with capping layer 406 being 100-nm thick silica (n=1.4), dielectric slab 404 being 200-nm thick $Si_3N_4$ (n=2) and substrate 402 being quartz (n=1.45).

Figure 5A:
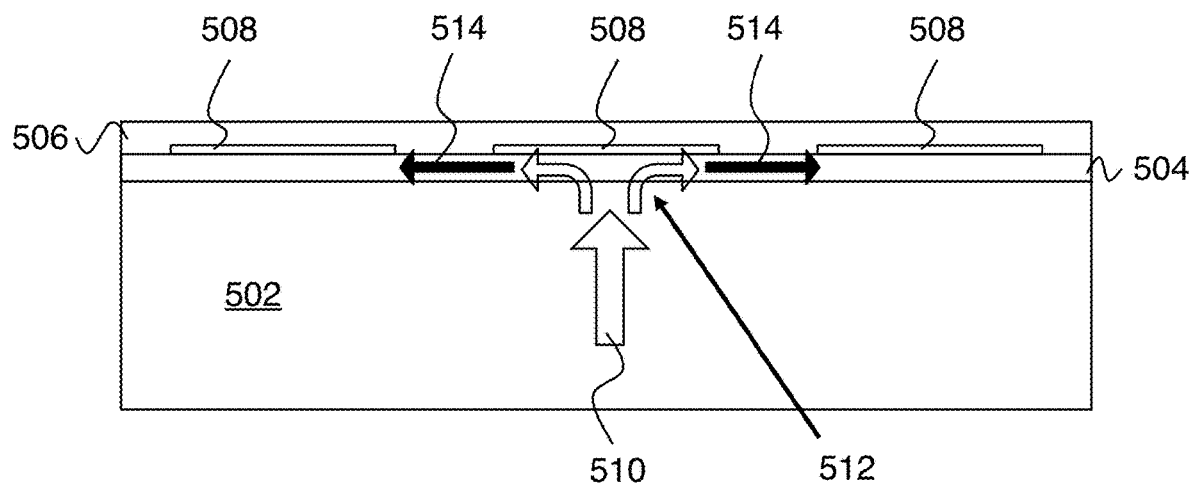
FIG. 5A shows an exemplary embodiment of the invention and schematically shows diffractive coupling of incident light to a waveguide mode.

FIG. 5A shows an exemplary embodiment of the invention and schematically shows diffractive coupling of incident light to a waveguide mode. Here 502, 504 and 506 are substrate, dielectric slab and capping layer, respectively, as described above. Ultra-thin, top grating layer 508 is embedded in the capping layer, which interfaces the incident planewaves 510 to a guided mode 514 along the dielectric slab (guided mode resonance). This coupling is schematically shown here by 512, and is described in greater detail above. The constituting material for grating layer 508 (typically Si) either enhances or depresses the field strength of the guided mode resonance depending on its absorption coefficient at the wavelength of interest. The material could be chosen among the dielectrics which show frequency selective absorbing properties such as Si, Ge, InP, GaAs, or 2-dimensional materials such as: $MoS_2$, $WS_2$, or $WSe_2$ etc. The thickness of the top grating layer 508 could vary from 0.6 to 10 nm. The period of grating 508 could be from 500 nm to 1500 nm, depending on the operating wavelength. The grating line width could be from 0.05 to 0.95 of the grating period. Grating elements can be designed to enhance efficiency in a desired diffraction order by varying the filling fraction (ratio of grating line width to grating period).

Figure 5B:
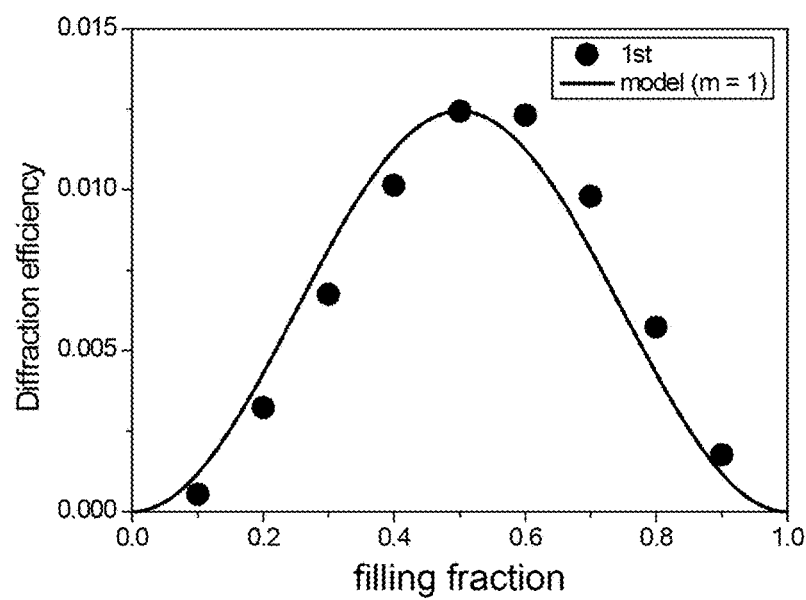
FIGS. 5B-C show results of an exemplary calculation of diffraction efficiency vs. grating filling fraction.
Figure 5C:
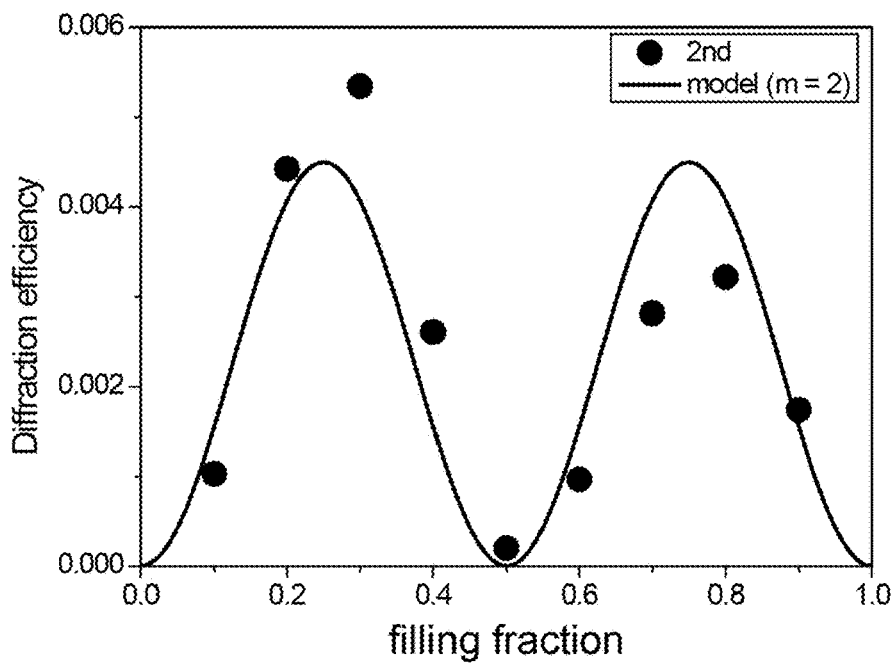

FIGS. 5B-C show examples of this where diffraction into the first order (m=1) is maximized at a filling fraction of 0.5 (FIG. 5B), and diffraction into the second order (m=2) is maximized at filling fractions of 0.25 and 0.75 (FIG. 5C). Here the solid lines are analytical predictions based on interference theory and the solid circles are numerically simulated data by rigorous coupled wave analysis.

Figure 5D:
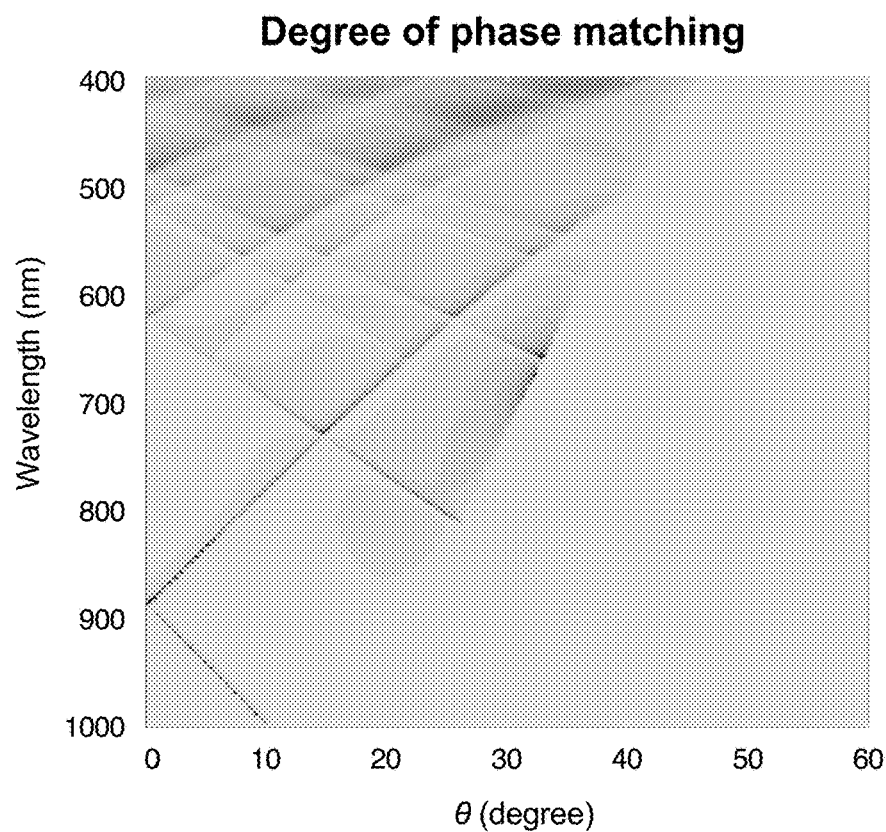
FIG. 5D shows results of an exemplary calculation of diffraction efficiency vs. wavelength and angle.

FIG. 5D shows results of an exemplary calculation of diffraction efficiency vs. wavelength and angle. When satisfying the phase matching condition, a significant portion of the incident energy couples to the guided-mode resonance. The phase matching condition is satisfied at specific angles depending on the wavelength of incident light (see the image of FIG. 5D and/or Equations 2a-b). In the image of FIG. 5D, darker shading corresponds to higher diffraction efficiency.

Figure 6A:
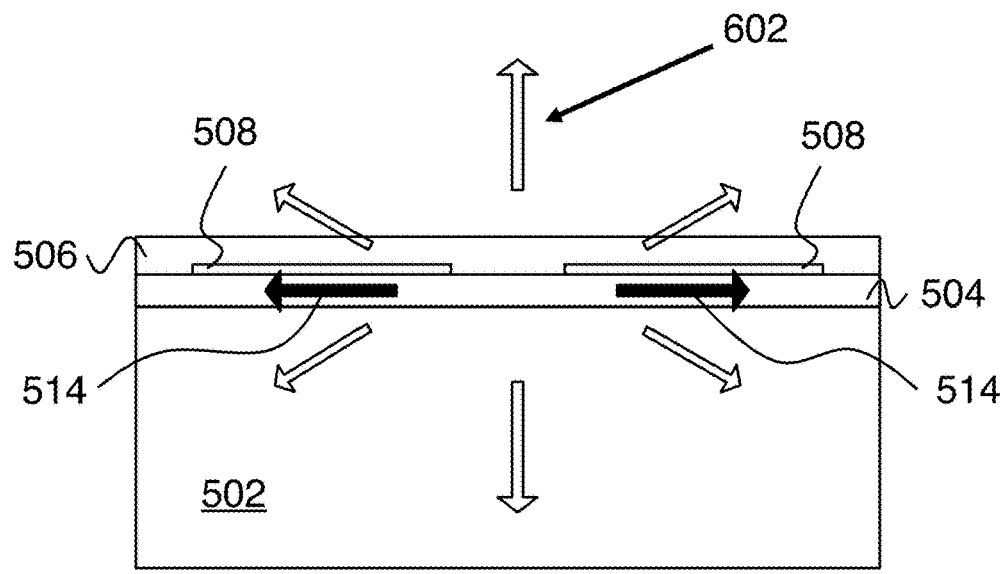
FIG. 6A shows an exemplary embodiment of the invention and schematically shows diffractive coupling from a waveguide mode to output diffracted light.

FIG. 6A shows an exemplary embodiment of the invention and schematically shows diffractive coupling from a waveguide mode to output diffracted light. Here 602 is output resonantly diffracted light provided by process 260 on FIG. 2. The guided mode resonance radiates its energy into far-field propagating waves through different diffractive orders. Typically, >10% power efficiency in the desired order can be achieved, as demonstrated by rigorous coupled wave analysis (RCWA).

Figure 6B:
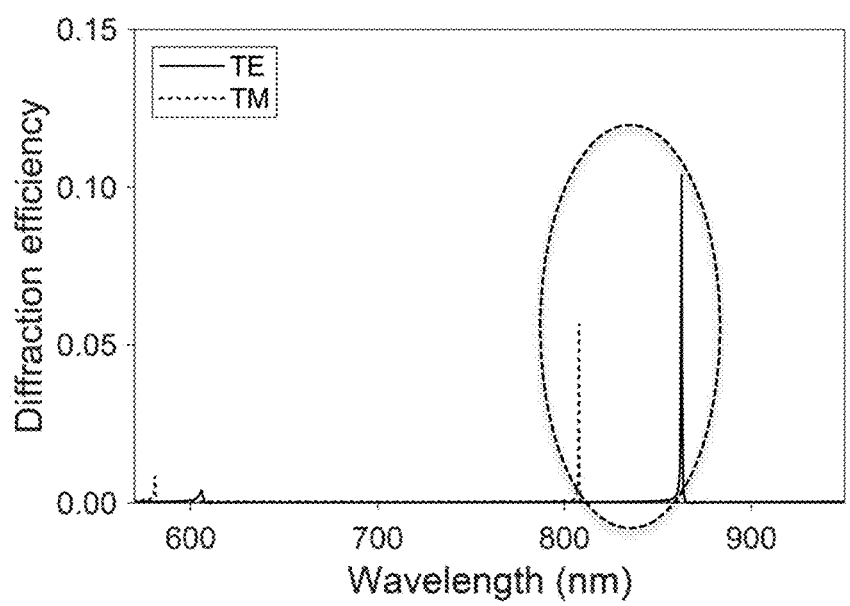
FIG. 6B shows results of an exemplary calculation of diffraction efficiency vs. wavelength for the process of FIG. 6A.

FIG. 6B shows results of an exemplary calculation of diffraction efficiency vs. wavelength for the process of FIG. 6A. Here the simulation parameters are as above in connection with FIG. 4B with the addition of a silicon grating layer having 3 nm thickness, 900 nm line width and 1000 nm period.

Figure 7A:
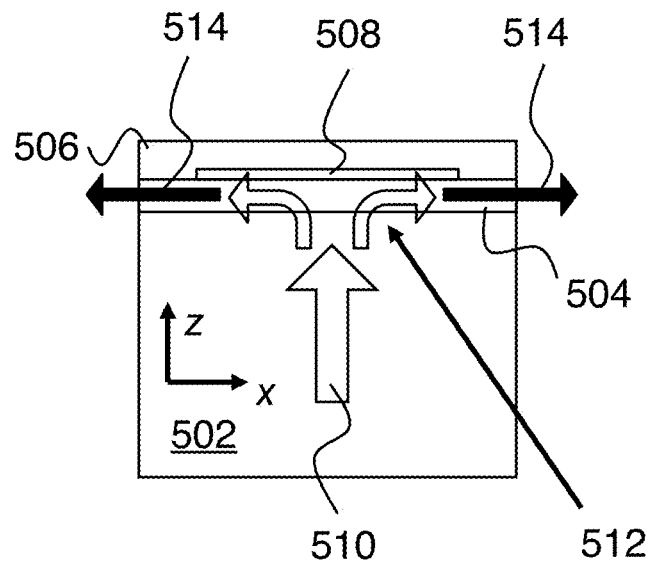
FIG. 7A shows an exemplary embodiment of the invention and schematically shows absorption of light in the waveguide mode.

FIG. 7A shows an exemplary embodiment of the invention and schematically shows light propagating in the waveguide mode. As indicated above, resonant diffraction entails propagation of light for a significant distance (i.e., many wavelengths) in a guided mode 514. As a result of this geometry, material absorption in grating layer 508 can be used to suppress undesired diffraction orders, even though layer 508 is so thin its single-pass absorption can be negligible. Due to the long interaction length along the x direction, even few-nm-thick top grating is able to manifest significant light absorption.

Figure 7B:
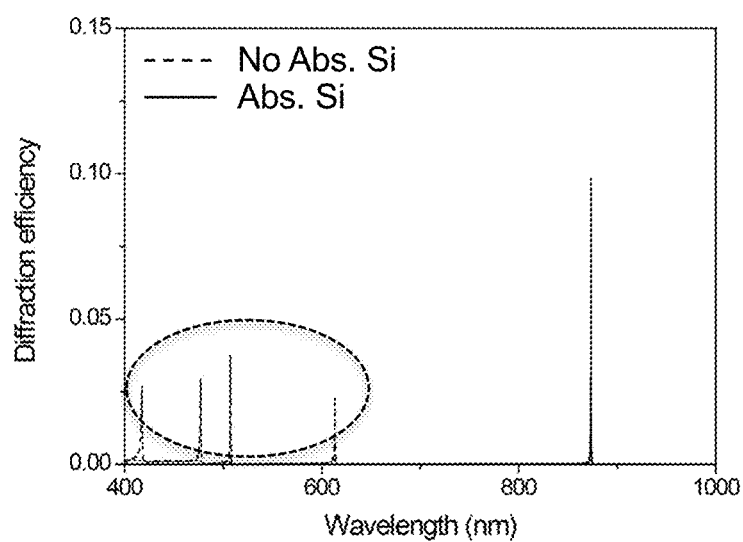
FIG. 7B shows results of an exemplary calculation of diffraction efficiency vs. wavelength for the process of FIG. 7A, showing the effect of absorption in the grating.

FIG. 7B shows results of an exemplary calculation of diffraction efficiency vs. wavelength for the process of FIG. 7A, showing the effect of absorption in the grating. Here results with and without absorption from the 3 nm thick silicon grating are shown, demonstrating the significant effect of this material absorption on device performance.

Figure 8A:
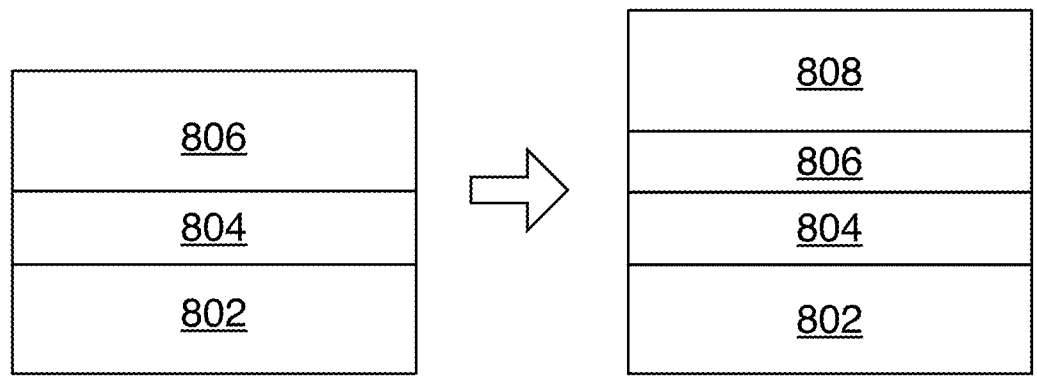
FIG. 8A schematically shows part of an exemplary fabrication process suitable for making embodiments of the invention.
Figure 8B:
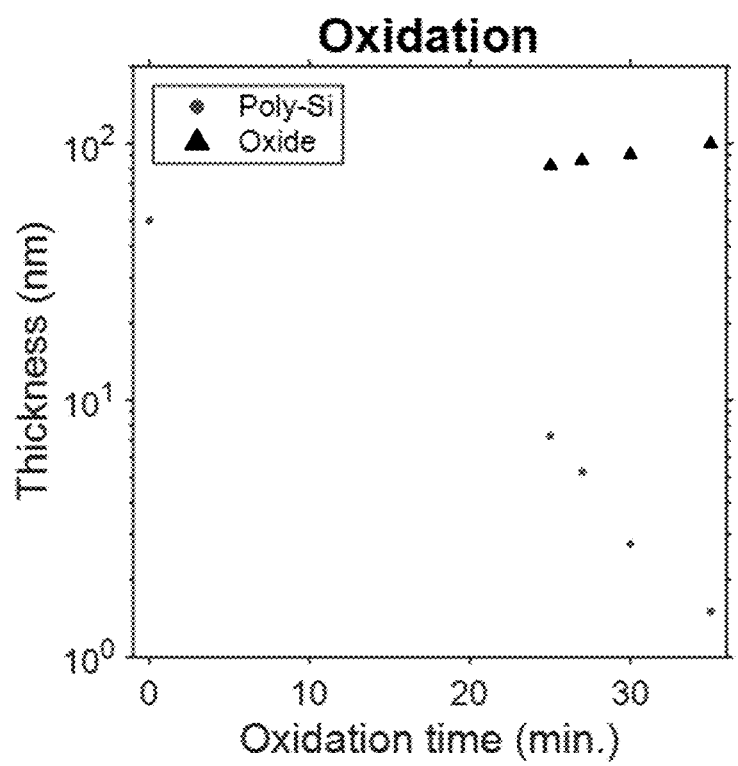
FIG. 8B shows the ability to form ultra-thin Si layers using the process of FIG. 8A.

FIG. 8A schematically shows part of an exemplary fabrication process suitable for making embodiments of the invention. Here 802 is a substrate, 804 is a silicon nitride slab and 806 is silicon. The right side of the figure shows the result of oxidizing silicon 806 to provide silicon oxide 808. This oxidation process consumes silicon layer 806, and by timing the duration of the oxidation step, precise control of the resulting silicon layer thickness can be achieved, as shown on FIG. 8B. Once the thin silicon layer is formed, it can be patterned into a grating using conventional lithography. Moderate oxidation rate (~nm/min.) allows one to control the thickness in precise manner. Fabrication of 1, 3, 5, and 7-nm-thick Si grating structures has been achieved for large areas (cm scale).

Figure 9:
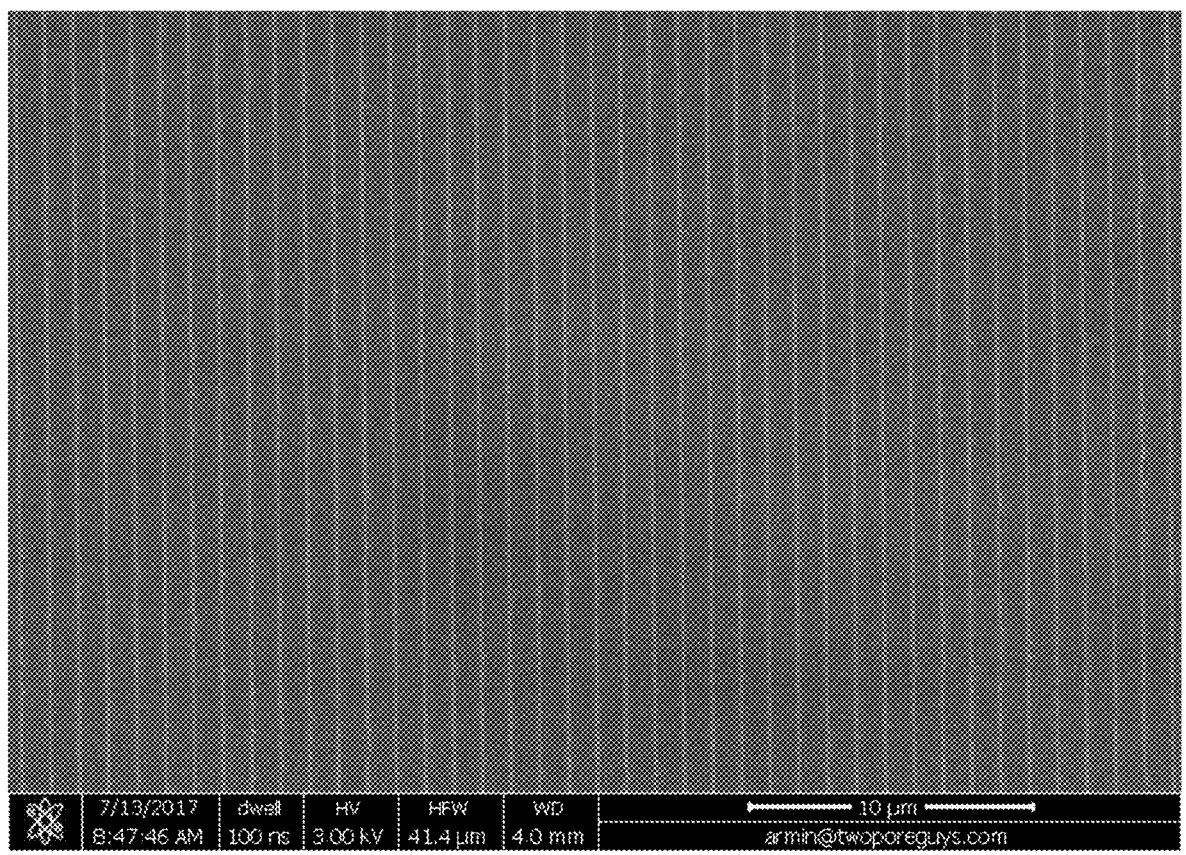
FIG. 9 is an image of a fabricated resonant diffraction structure.

FIG. 9 is an image of a fabricated resonant diffraction structure.

Figure 10A:
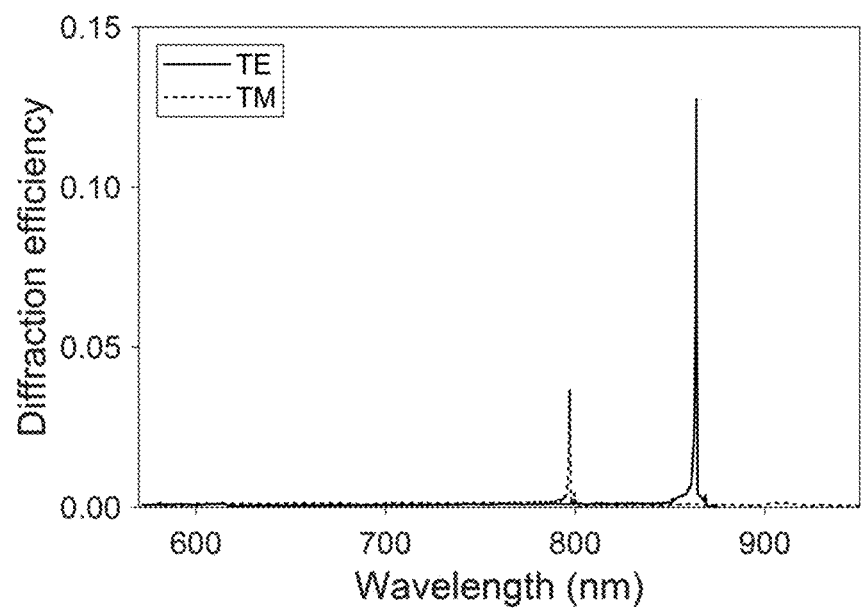
FIGS. 10A-B show experimental and simulated resonant diffraction efficiency vs. wavelength from an experiment.
Figure 10B:
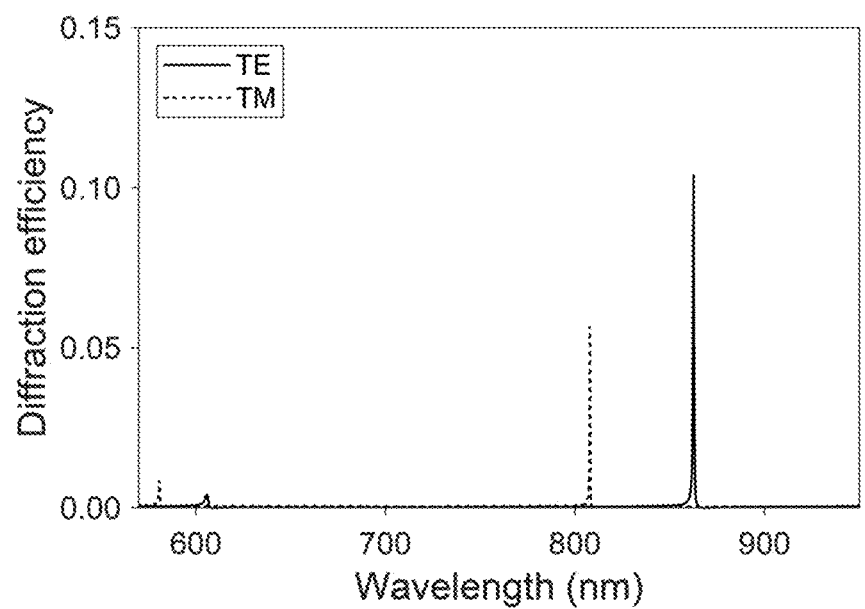
Figure 11A:
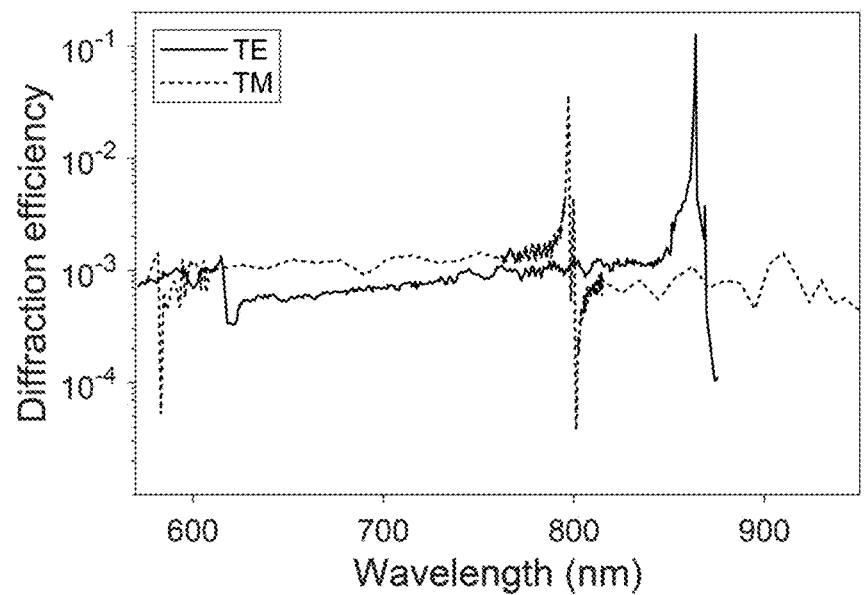
FIGS. 11A-B show the results of FIGS. 10A-B on a logarithmic scale.
Figure 11B:
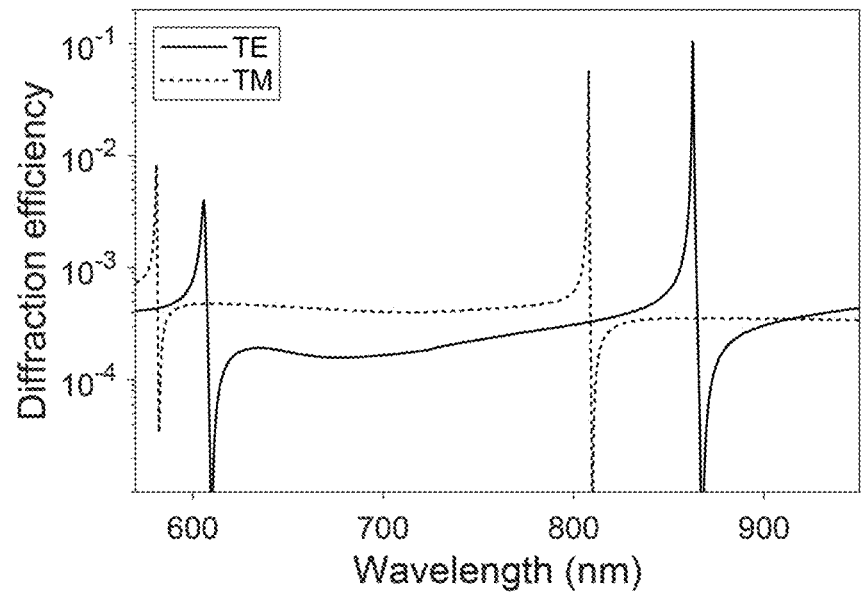

FIGS. 10A-B show experimental and simulated resonant diffraction efficiency vs. wavelength from an experiment. FIGS. 11A-B show the results of FIGS. 10A-B on a logarithmic scale. These results show >10% diffraction efficiency at near-infrared resonance peak combined with <0.1% of diffraction efficiency in visible spectral range.

The invention claimed is:

1. Optical apparatus comprising:
    an optical waveguide;
    a diffraction grating disposed in proximity to the optical waveguide such that incident light on the diffraction grating can also diffractively couple to the optical waveguide;
    wherein a first diffraction process is non-resonant diffraction of the incident light by the diffraction grating without coupling to the optical waveguide;
    wherein a second diffraction process is resonant diffraction of the incident light via 1) diffractive coupling of the incident light to a guided mode of the optical waveguide to provide guided light, followed by 2) additional diffraction of the guided light into diffracted radiation;
    wherein an efficiency of the second diffraction process is substantially larger than any efficiency of the first diffraction process at a predetermined incidence angle and frequency of the incident light.

2. The apparatus of claim 1, wherein the efficiency of the second diffraction process is 10× or more greater than any efficiency of the first diffraction process.

3. The apparatus of claim 1, wherein a combined efficiency of parasitic diffraction processes is 0.1% or less.

4. The apparatus of claim 1, wherein a thickness of the diffraction grating is between 0.6 nm and 10 nm.

5. The apparatus of claim 1, wherein a ratio of grating line width to grating period is selected to enhance diffraction efficiency into a selected diffraction order.

6. The apparatus of claim 1,
    wherein the waveguide is a planar waveguide formed by a core layer sandwiched between a substrate and a capping layer;
    wherein the diffraction grating is disposed at an interface between the core layer and the capping layer.

7. The apparatus of claim 1, wherein the diffraction grating is formed in a material selected from the group consisting of: Si, Ge, InP, GaAs, $MoS_2$, $WS_2$, and $WSe_2$.

8. An augmented reality display comprising:
    the optical apparatus of claim 1;
    further comprising an infrared source emitting at a source wavelength between 800 nm and 1500 nm;
    wherein the optical apparatus is configured to have zero order transmittance of 90% or more in a wavelength range from 400 nm to 750 nm;
    wherein the optical apparatus is configured to provide selective redirection of light at the source wavelength via the second diffraction process.

9. The apparatus of claim 8, wherein a thickness of the diffraction grating is between 0.6 nm and 10 nm.

10. The apparatus of claim 8, wherein an efficiency of the selective redirection of light at the source wavelength is 10% or more.

11. The apparatus of claim 8, wherein a combined efficiency of parasitic diffraction processes is 0.1% or less.

12. The apparatus of claim 8, wherein the diffraction grating is formed in a material that is opaque in a wavelength range from 400 nm to 750 nm.

13. The apparatus of claim 12, wherein the diffraction grating is formed in silicon.

* * * * *